(12) United States Patent
Haupt

(10) Patent No.: US 6,481,556 B1
(45) Date of Patent: Nov. 19, 2002

(54) PARKING LOCK FOR THE AUTOMATIC TRANSMISSION OF MOTOR VEHICLES

(75) Inventor: Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/744,606

(22) PCT Filed: Aug. 14, 1999

(86) PCT No.: PCT/EP99/05978

§ 371 (c)(1),
(2), (4) Date: Jan. 26, 2001

(87) PCT Pub. No.: WO00/10846

PCT Pub. Date: Mar. 2, 2000

(30) Foreign Application Priority Data

Aug. 20, 1998 (DE) .......................... 198 37 832

(51) Int. Cl.[7] .......................... B60T 1/00; F16H 63/48
(52) U.S. Cl. .......................... 192/219.5; 188/31
(58) Field of Search .......................... 192/219.4, 219.5, 192/219.6; 188/31, 69; 74/411.5; 303/89

(56) References Cited

U.S. PATENT DOCUMENTS

| 3,043,403 A | * | 7/1962 | Kelley | .......... 188/69 |
|---|---|---|---|---|
| 4,576,261 A | | 3/1986 | Barr | |
| 4,722,427 A | | 2/1988 | Prumbaum et al. | |
| 5,187,999 A | | 2/1993 | Kobayashi et al. | |
| 5,954,179 A | * | 9/1999 | Osborn | .......... 192/219.5 |

FOREIGN PATENT DOCUMENTS

| DE | 35 37 091 C1 | 4/1987 |
| DE | 41 27 991 A1 | 2/1993 |
| DE | 43 17 257 C1 | 5/1994 |
| DE | 196 43 812 A1 | 5/1998 |

* cited by examiner

Primary Examiner—Richard M. Lorence
(74) Attorney, Agent, or Firm—Davis & Bujold, P.L.L.C.

(57) ABSTRACT

Parking lock which on the basis of an actuating signal triggered by the driver via an actuating device is engaged and disengaged by the fact that a piston (6) causes a detent disc (2) to rotate in such a way that, via a connection (19), a lock (17) is actuated which engages or disengages the parking lock. When engaged, the parking lock can be unlocked via a manual actuating device (13) causing an emergency release disc (3) to rotate by the fact that a bolt (4) likewise causes the detent disc (2) to rotate and then engages a detent unit (14) which maintains the parking lock in unlocked state. By repeated application of a hydraulic force to the actuating device (7) the detent unit (14) can be automatically disengaged by the detent disc (2) being caused to rotate.

7 Claims, 4 Drawing Sheets

PARKING LOCK FOR THE AUTOMATIC TRANSMISSION OF MOTOR VEHICLES

The invention relates to a parking lock for automatic transmissions of motor vehicles where the output of the transmission is blocked by a locking pawl engaging in a parking interlock gear, the latter thus being protected against torsion.

BACKGROUND OF THE INVENTION

DE 43 17 257 describes a parking lock for automatic transmissions of motor vehicles where a locking pawl is drawn out from the parking interlock gear by a cylinder being filled with pressurized oil and the piston thereof moving a connecting rod against spring tension via a gate member. By manually moving a hand lever via an operative connection, the connecting rod with the locking pawl can be moved in the gate member and the parking lock is thus unlocked. By the piston rod having a direct connection with the connecting rod of the locking pawl and thus a linear movement being directly transmitted to the connecting rod, via a linearly moved gate member, the operative connection, which also carries out a linear movement since it ends in the passenger space of the vehicle, has to be expensively sealed in the automatic transmission. Should the parking lock be hydraulically unlocked, the locking pawl is drawn out from the parking interlock gear by the connecting rod carrying out a linear motion which is drawn back by a pin passed in a diagonally extending groove of the gate member. Thereby considerable frictional forces appear between the pin and the diagonally extending groove. If the parking lock is manually unlocked in an emergency and the pin engages in the gate member, this position can again be disengaged by the piston of the hydraulic unit being loaded with pressure and the pin being enabled to leave the engagement. In this state, the possibility exists that the pin impinges upon the forking of the grooves in the gate member and being sheared off at the same time. By using a gate member, there is, likewise, the possibility that jerks during driving produce an undesired operation of the parking lock device, since a linearly supported gate member constitutes a spring-mass system which reacts to linear forces.

The invention is based on the problem of providing a parking lock for an automatic transmission of a motor vehicle which stands out by great operational security, simple construction, reliable sealing and low friction.

SUMMARY OF THE INVENTION

The parking lock comprises a fixture which is connected with a connecting rod having a locking pawl and is moved by a hydraulic actuating device comprised of one piston, one cylinder and one recoil spring. The fixture consists of two discs which are disposed on a common shaft and by rotation of the discs operation of the parking lock can be actuated. The first disc, here called the detent disc, has a first, eccentrically mounted connection to a connecting rod having a locking pawl, and, opposite to the first connection and eccentrically disposed, a second connection to a hydraulic actuating device. If the hydraulic actuating device is actuated, the parking lock is locked and unlocked exclusively by the rotary motion of the fixture. A second disc, here called the emergency release disc, has, via a pivot which can move in a groove in the detent disc, a connection to the detent disc, and a connection via a central shaft, with which the emergency release disc is non-rotatably connected, and upon which the detent disc is rotatably supported, which shaft is connected outside the transmission via a seal in the housing of the transmission with an operative connection for the emergency release. The emergency release disc rotates within to stop and automatically come to a position in which the parking lock is unlocked, via the emergency release, and thus the rotation of the emergency release disc and, via the pivot, the rotation of the detent disc, and by a detent unit, preferably a spring, is kept in this position until this position is again turned back to the initial state by rotation of the first disc by automatic unlocking of the detent. By the fact that the discs carry out a clear rotary motion, it is possible to easily support the central shaft of the discs in the housing of the automatic transmission and because the shaft is passed outwardly through the housing of the automatic transmission, an operative connection can be easily attached and the shaft sealed in the housing for reliable operation. By not using any masses which have to be linearly moved, the invention operates reliably even under great shock loads.

BRIEF DESCRIPTION OF THE DRAWINGS

From the descriptions that follow of the operations of the embodiments, other features essential to the invention can be inferred. A preferred embodiment of the invention is described herebelow with the appertaining drawings which show.

DESCRIPTION OF THE PREFERRED EMBODIMENT

Figure 1:
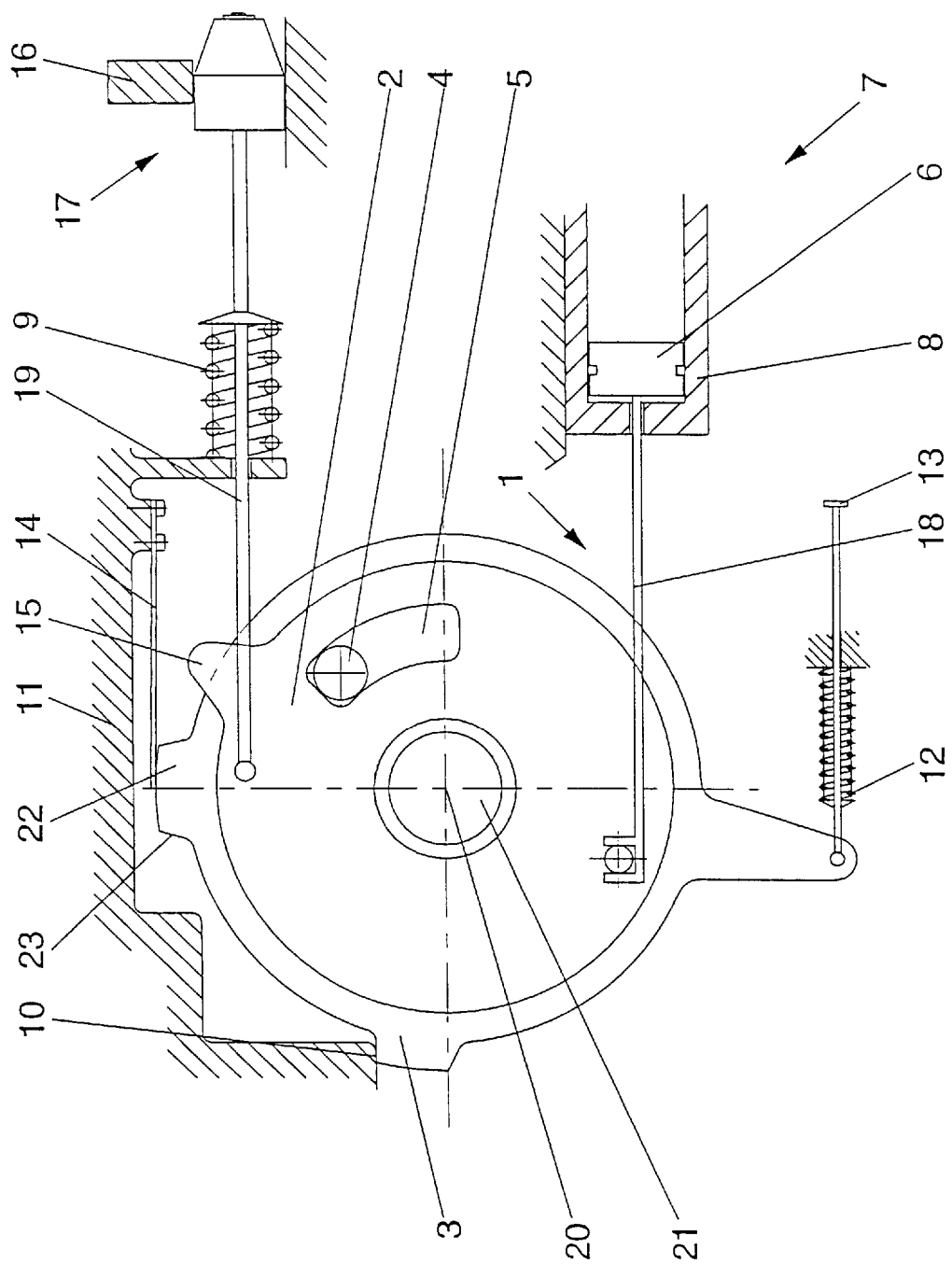
FIG. 1 is a parking lock in which the parking interlock gear is blocked by the parking pawl.

FIG. 1:

Within a housing 11 of an automatic transmission is located a parking lock which comprises one fixture 1, one actuating device 7, one manual actuating device 13 and one lock 17. If no system pressure is produced by the automatic transmission, the actuating device 7 is pressureless and the piston 6 is moved, via the spring 9, toward its stop in the cylinder 8 or the stop of the recess 5 on the pivot 4. The piston 6 is connected, via a connection 18, via a detent disc 2 and via a connection 19 with the lock 17 which consists of one cone and one parking pawl 16, the same as a parking interlock gear (not shown). By moving piston 6 to its stop in the cylinder 8, the detent disc is rotated by the connection 18 around its central axis 20 and moves the connection 19, assisted by the tension of the spring 9, so that at the lock 17 the parking pawl 16 engages with the parking interlock gear and blocks the parking interlock gear. The detent disc 2 has a recess 5 in which pivot 4 is located, which is secured to an emergency release disc 3. The emergency release disc 3 is pressed by the tension of the spring 12 against the stop 10 on the transmission housing 11. The force of the manual actuating device and of the spring 12 is applied via the shaft 21 to the emergency release disc 3. For a better understanding, in FIGS. 1, 2 and 3, the manual actuating device is connected via a cam with the emergency release disc 3. Since the stop 10 of the emergency release disc 3 abuts against the housing 11, the detent disc 2 is rotated until the recess 5 abuts against the pivot 4 or the piston 6 in the cylinder 8. The detent unit 14 consists of a prominence 22 and a detent spring, which the disengaged state, is located on the prominence 22.

Figure 2:
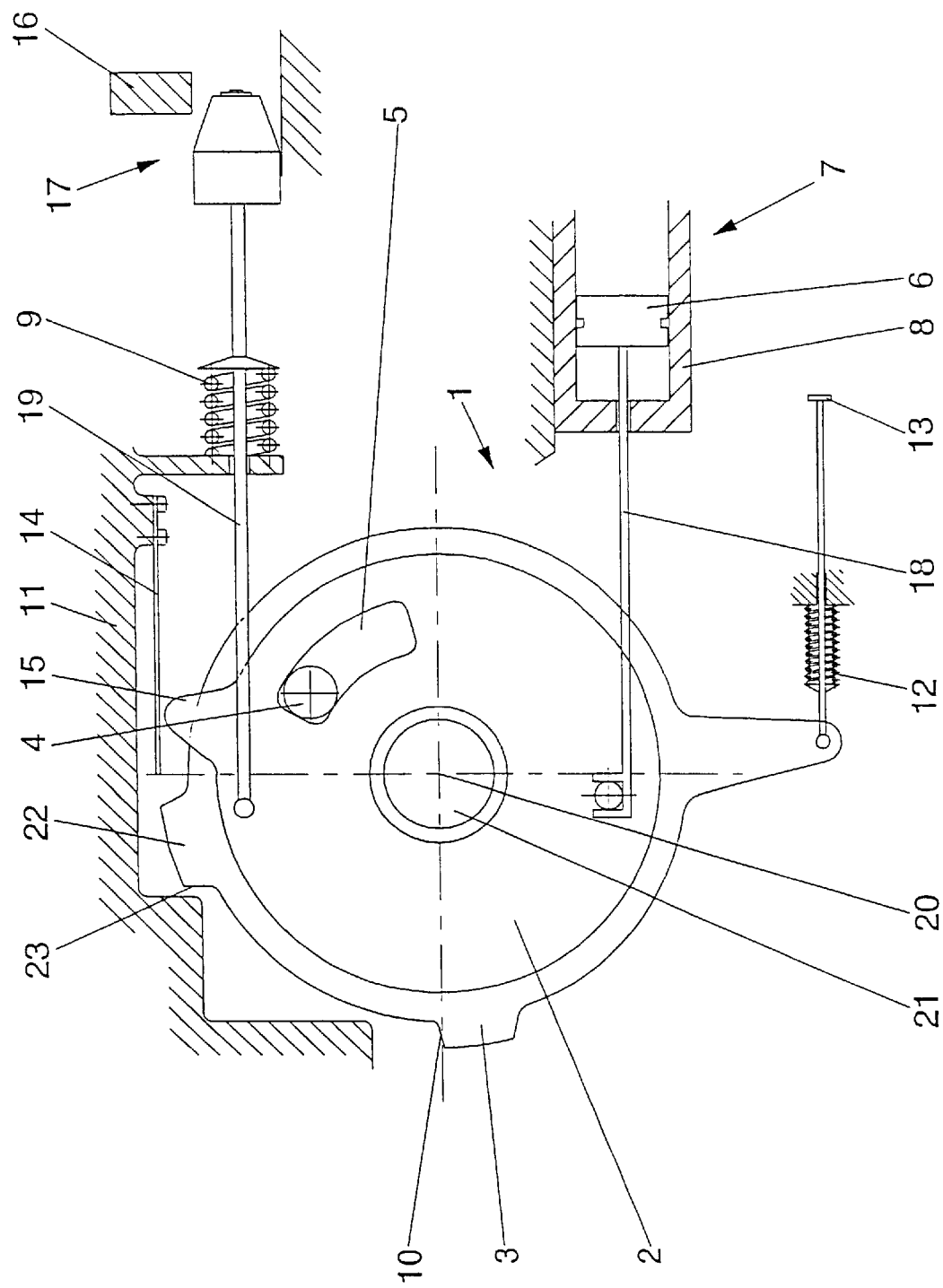
FIG. 2 is a parking lock which is manually unlocked so that the parking pawl releases the parking interlock gear.

FIG. 2:

In FIG. 2 is described the state in which the parking lock is manually unlocked. This is necessary when the vehicle has to be towed. By the manual actuating device 13 being actuated, the emergency release disc 3 rotates until the stop 23 abuts against the housing 11. At the same time, the spring 12 compressed. The pivot 4, which is fastened on the emergency release disc 3, abuts against the recess 5 of the detent disc 2 and causes the detent disc 2 to rotate until the connection 19 unlocks the lock 17. After the emergency release disc 3, with its stop 23, has reached the housing 11, the parking lock is unlocked and the detent unit 14 engages the prominence 22 in the emergency release disc 3. In this position, the vehicle can be towed.

Figure 3:
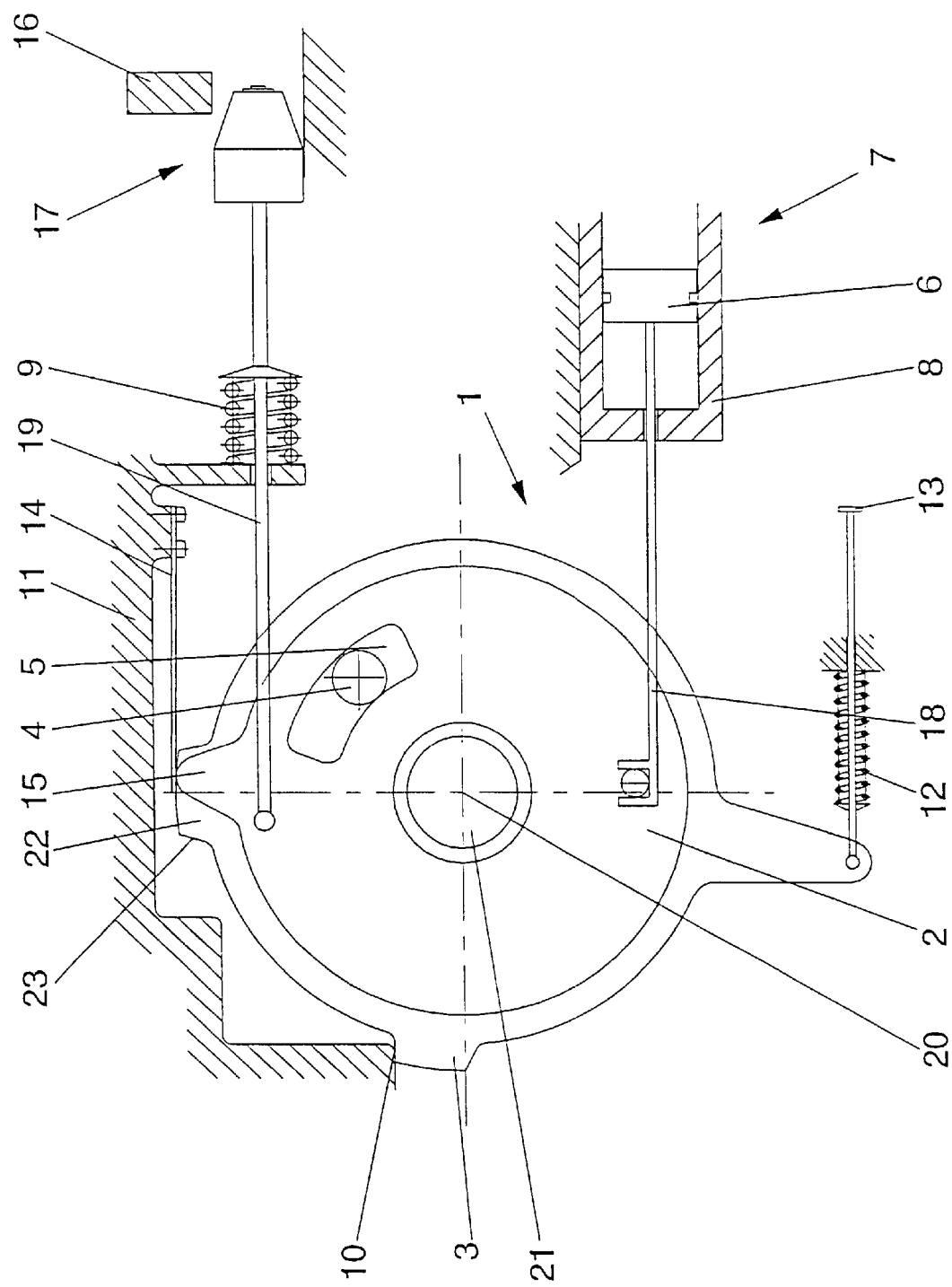
FIG. 3 is a parking lock which is hydraulically unlocked so that the parking pawl releases the parking interlock gear.

FIG. 3:

FIG. 3 shows a position of the parking lock which unlocks the parking lock by applying a hydraulic force. To this end, a hydraulic pressure is supplied to the cylinder 8 of the actuating device 7. The pressure acts upon the piston 6 and moves the piston and the connection 18. Thereby the detent disc 2 is caused to rotate and the cam 15 lifts the detent unit 14 so that the emergency release disc 3, with the prominence 22, can slide under the detent unit 14 until the stop 10 abuts against the housing 11. The emergency release disc 3 and the manual actuating device 13 can thus be returned to their initial state by the tension of the spring 12. The connection 19 is simultaneously moved by the rotation of the detent disc 2 so that the lock 17 is unlocked against the spring tension 9. Thereby the detent unit 14 of the emergency release device is automatically reset by applying a hydraulic pressure in the actuating device 7. The detent spring can also have, on its free end, a roller making possible that the detent unit is more easily disengaged from the cam 15.

Figure 4:
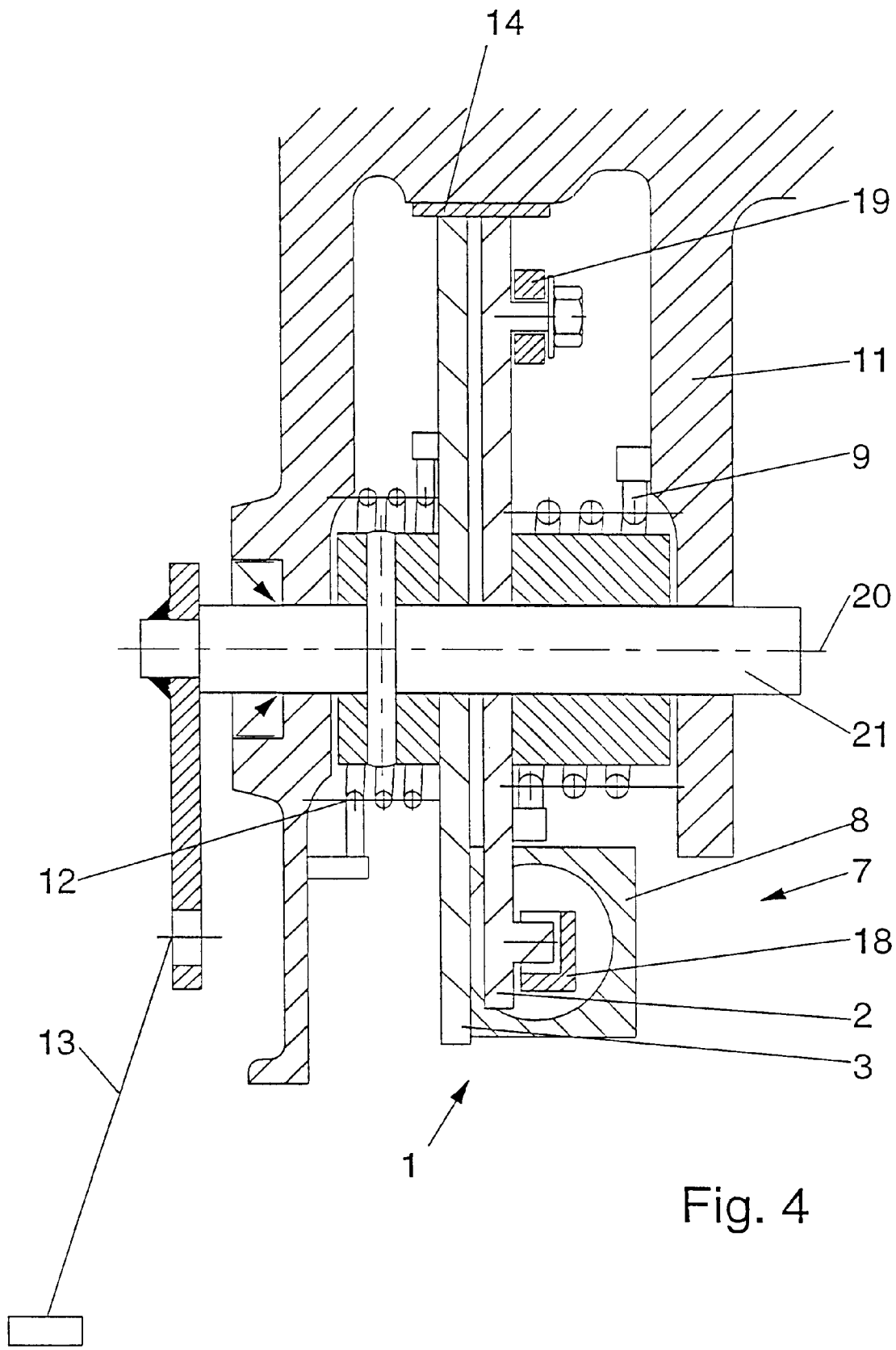
FIG. 4 is a parking lock of the above described type in sectional representation.

FIG. 4:

FIG. 4 shows a section through the fixture which demonstrates, in particular, the simple attachment of the manual actuating device 13 on the emergency release disc 3 via the shaft 21. This structural make-up provides a simple and operationally reliable seal of the release fixture 1. The shaft 21, and thus the detent disc 2 and the emergency release disc 3, can rotate around the central axis 20 and are supported in the housing 11. The emergency release disc 3 is preferably connected by a pin connection with the shaft 21. The detent disc 2 is rotatably supported on the shaft 21.

| Reference numerals | |
|---|---|
| 1 fixture | 13 manual actuating device |
| 2 detent disc | 14 detent unit |
| 3 emergency release disc | 15 cam |
| 4 pivot | 16 parking pawl |
| 5 recess | 17 lock |
| 6 piston | 18 connection |
| 7 actuating device | 19 connection |
| 8 cylinder | 20 central axis |
| 9 spring | 21 shaft |
| 10 stop | 22 prominence |
| 11 housing | 23 stop |
| 12 spring | |

What is claimed is:

1. A parking lock for an automatic transmission of a motor vehicle, comprising:

an actuating signal, triggered by a driver via a hydraulic actuating device (7), for one of blocking and releasing the automatic transmission;

a parking pawl (16) movable via a rotatable fixture (1);

the fixture (1) comprising, in combination with the hydraulic actuating device (7),:
  a first disc (2);
  a second disc (3); and
  a detent unit (14);

the hydraulic actuating device comprising:
  a piston (6);
  a cylinder (8); and
  one recoil spring (9); and the parking pawl (16) being one of movable manually from a vehicle space, via an operating connection, and hydraulically movable via the actuating device (7);

wherein the parking pawl (16) is moved to one of: (a) a disengaged state by a rotation in a first direction of the fixture (1) around a central axis (20), by a first pressurized shifting of the hydraulic actuating device (7), and, at the same time, bringing the detent unit (14) to an open state; and (b) is moved to an engaged state by a rotation in a second opposite direction of the fixture (1) around the central axis (20), by a second pressureless shifting of the hydraulic actuating device (7).

2. The parking lock according to claim 1, wherein the fixture (1) comprises the first and second discs (2,3) disposed upon the common central axis (20); and the first and second discs (2, 3) are connected via a bolt (4) located in a recess (5) in the first disc (2) which delimits a torsion path of the first and second discs relative to one another.

3. The parking lock according to claim 1, wherein torsion paths of the first and second discs (2, 3) of the fixture are delimited by a first stop surface (10) and a second stop surface (23).

4. The parking lock according to claim 2, wherein torsion paths of the first and second discs (2, 3) of the fixture are delimited by a first stop surface (10) and a second stop surface (23).

5. A parking lock for an automatic transmission of a motor vehicle, comprising:

an actuating signal, triggered by a driver via a hydraulic actuating device (7), for one of blocking and releasing the automatic transmission;

a parking pawl (16) movable via a rotatable fixture (1);

the fixture (1) comprising, in combination with the hydraulic actuating device (7),:
  a first disc (2);
  a second disc (3); and
  a detent unit (14);

the parking pawl (16) being one of movable manually from a vehicle space, via an operating connection, and hydraulically movable via the actuating device (7);

wherein the parking pawl (16) is moved to one of: (a) a disengaged state by a rotation in a first direction of the fixture (1) around a central axis (20), by a first pressurized shifting of the hydraulic actuating device (7), and, at the same time, bringing the detent unit (14) to an open state; and (b) is moved to an engaged state by a rotation in a second opposite direction of the fixture (1) around the central axis (20), by a second pressureless shifting of the hydraulic actuating device (7).

6. The parking lock according to claim 1, wherein the fixture (1) comprises The first and second discs (2,3) disposed upon the common central axis (20); and the first and second discs (2, 3) are connected via a bolt (4) located in a recess (5) in the first disc (2) which delimits a torsion path of the first and second discs relative to one another.

7. The parking lock according to claim 5, wherein torsion paths of the first and second discs (2, 3) of the fixture are delimited by a first stop surface (10) and a second stop surface (23).

* * * * *